United States Patent
Hsiao et al.

(10) Patent No.: US 7,232,249 B2
(45) Date of Patent: Jun. 19, 2007

(54) BACK LIGHT MODULE

(75) Inventors: Chih-Chun Hsiao, Kaohsiung County (TW); Cheng-Min Liao, Taoyuan County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 38 days.

(21) Appl. No.: 10/906,542

(22) Filed: Feb. 24, 2005

(65) Prior Publication Data

US 2006/0187681 A1    Aug. 24, 2006

(51) Int. Cl.
*F21V 7/04*  (2006.01)

(52) U.S. Cl. .................. 362/614; 362/615; 362/634; 362/558

(58) Field of Classification Search ............ 362/612, 362/613, 614, 615, 632, 634, 558
See application file for complete search history.

(56) References Cited

U.S. PATENT DOCUMENTS 6,409,356 B1 *  6/2002  Nishimura ................. 362/632
6,976,780 B2 * 12/2005  Lee et al. .................. 362/622
2005/0041412 A1 *  2/2005  Lin ............................. 362/31

* cited by examiner

*Primary Examiner*—Sandra O'Shea
*Assistant Examiner*—Zahra I. Bennett
(74) *Attorney, Agent, or Firm*—Jianq Chyun IP Office

(57) ABSTRACT

A back light module is disclosed. The back light module comprises a frame, a reflective mask, a light guide plate, a linear light source and a baffle plate, wherein the reflective mask is installed in the frame. The linear light source is surrounded by the light guide plate and the reflective mask. The baffle plate is disposed between the linear light source and the light guide plate and the baffle plate is connected to the reflective mask and the frame. The baffle plate disposed between the linear light source and the light guide plate is adapted for absorbing impact force during the impact test and reducing the possibility of displacement of the light guide plate. Thus, the possibility of damage to the linear light source due to displacement of the light guide plate can be effectively reduced. Thus, the reliability of the notebook computer can be effectively promoted.

15 Claims, 6 Drawing Sheets

BACK LIGHT MODULE

BACKGROUND OF THE INVENTION

1. Field of the Invention

The present invention relates to a back light module. More particularly, the present invention relates to a back light module capable of reducing damage to the linear light source thereof by the impact of the light guide plate during the impact test.

2. Description of Related Art

With the advancement of information technology, the personal computer is developing toward portable notebook computer as the portable notebook computer provides convenience of portability and access to information. Therefore the notebook computer is highly attractive to a variety of people for business, correspondence, research, entertainment and the like. Different types of the portable notebook computers have been extensively developed in order to meet various needs of users.

Generally, in order to ensure the quality of the notebook computer such as operation and stability under various conditions, prior to shipping out to the warehouse for storage, the notebook computer are being subjected to a plurality of tests during various manufacturing stages. As for impact test, as the reflective mask for light is difficult to firmly fix the light, and therefore the light guide plate may easily get displaced and because it is positioned proximate to the linear light source, and therefore the displacement of the light guide plate towards the linear light source may damage the linear light source. One conventional solution for resolving the above problem is to form an ear portion 131a on the light guide plate 131 and a protrusion portion 110a on the frame 110 (as shown in FIG. 1A) such that the ear portion 131a of the light guide plate 131 is locked onto the protrusion portion 110a of the frame 110 to prevent displacement of the light guide plate 131 toward the linear light source (not shown) during the impact test.

However, in order to increase the efficiency of the light guide plate, a plurality of V-shaped notches are formed on the surface of the light guide plate. However, as the ear portion may interfere with V-shaped notches, therefore the aforementioned technique of securing the light guide plate to the frame is not suitable for the light guide plate with V-shaped notches.

To resolve the aforementioned problem, another conventional solution is described as follows. FIG. 1B is a perspective schematic view of a portion of a conventional back light module. FIG. 1C is a schematic view of a guide light plate positioned using a double sided tape on a frame of the conventional back light module. Referring to FIGS. 1B and 1C, the conventional back light module comprises a frame 110, a reflective mask 120, a light guide plate 130 and a linear light source (not shown), wherein the reflective mask 120 is installed in the frame 110. The light guide plate 130 has a light incidence side 132 lodged into the reflective mask 120. The linear light source (not shown) is installed between the light incidence side 132 of the light guide plate 130 and the reflective mask 120.

In order to resolve the aforementioned problem, the light guide plate 130 therein is resisted from being displaced. The light guide plate 130 can be firmly fixed on the reflective mask 120 and the guide light plate 130 can be attached to the frame 110 using a double sided tape 140 (as shown in FIG. 1C) to resist the guide light plate 130 from displacing from the reflective mask 120. However, securing strength using the reflective mask 120 to hold the light guide plate 130 and using the double sided tape 140 to attach the reflective mask 120 to the frame 110 is not adequate, and during the impact test, the light guide plate 130 come loose from the reflective mask 120 and damage the linear light source.

SUMMARY OF THE INVENTION

Accordingly, the present invention is directed to a back light module comprising a baffle plate capable of absorbing the impact force during the impact test so that the possibility of displacement of the light guide plate can be reduced and damage to the linear light source due to the displacement of the light guide plate can be effectively reduced. Thus, the reliability of the notebook computer can be effectively promoted.

According to an embodiment of the present invention, a back light module is disclosed. The back light module comprises a frame, a reflective mask, a light guide plate, a linear light source and a baffle plate. The reflective mask is installed in the frame. The light guide plate comprises a light incidence side which is locked onto the reflective mask. The linear light source is surrounded by the light guide plate and the reflective mask. The baffle plate is installed between the linear light source and the light guide plate and the baffle plate is connected to the reflective mask and the frame.

According to an embodiment of the present invention, the shape of the baffle plate is Z-shape and comprises a first deflection portion and a second deflection portion. The first deflection portion of the baffle plate is propped against the reflective mask and the second deflection portion of the baffle plate is propped against the frame. In addition, the baffle plate is fixed on the frame and/or the reflective mask using a double sided tape.

According to an embodiment of the present invention, the shape of the baffle plate is L-shape and comprises a deflection portion. The deflection portion of the baffle plate is propped against the frame. In one embodiment, the deflection portion of the baffle plate is propped against the reflective mask.

According to an embodiment of the present invention, the baffle plate comprises a high thermal-conductive material such as metal.

According to an embodiment of the present invention, the baffle plate comprises an elastic material such as plastic material.

According to an embodiment of the present invention, the frame comprises an opening and the baffle plate is locked to the opening of the frame. In another embodiment, the reflective mask comprises an opening and the baffle plate is locked to the opening of the reflective mask.

According to another embodiment of the present invention, a back light module is disclosed. The back light module comprises a frame, a reflective mask, a light guide plate and a linear light source. The frame comprises a baffle plate and the reflective mask is installed in the frame. The light guide plate comprises a light incidence side, which is locked onto the reflective mask. The linear light source is surrounded by the light incidence side of the light guide plate and the reflective mask. The baffle plate is disposed between the linear light source and the light guide plate and the baffle plate is connected to the reflective mask and the frame.

According to an embodiment of the present invention, the reflective mask has an opening and the baffle plate is locked to the opening of the reflective mask.

According to an embodiment of the present invention, the baffle plate comprises an elastic material such as plastic material.

In summary, because the baffle plate of the back light module, according to the present invention, is disposed between the linear light source and the light guide plate, the baffle plate can absorb the impact force during the impact test and thereby reduce the possibility of displacement of the light guide plate and thus reduce the possibility of damage to the linear light source due to the displacement of the light guide plate. Moreover, the Z-shaped baffle plate comprises the first deflection portion propped against the reflective mask, so the holding force of the reflective mask for resisting the displacement of the light guide plate toward the light guide plate can be efficiently increased so that the reliability of the notebook computer can be effectively promoted.

DESCRIPTION OF THE EMBODIMENTS

Various specific embodiments of the present invention are disclosed below, illustrating examples of various possible implementations of the concepts of the present invention. The following description is made for the purpose of illustrating the general principles of the invention and should not be taken in a limiting sense. The scope of the invention is best determined by reference to the appended claims.

Figure 1A:
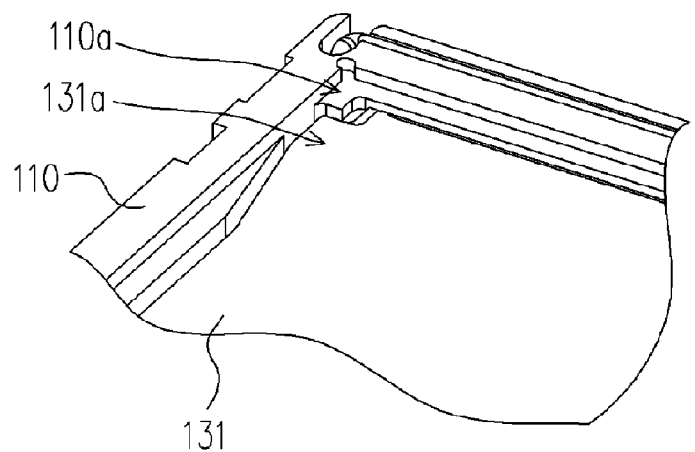
FIG. 1A is a perspective schematic view of a portion of a conventional back light module.
Figure 1B:
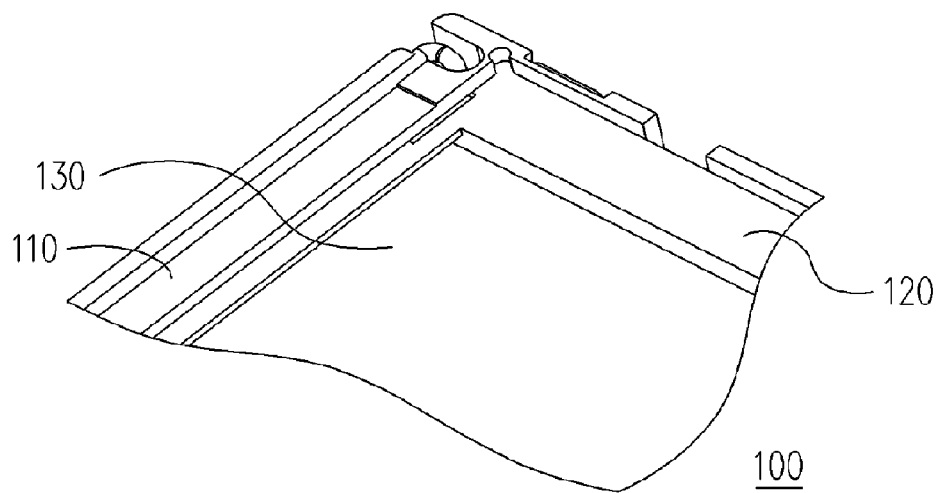
FIG. 1B is a perspective schematic view of a portion of another conventional back light module.
Figure 1C:
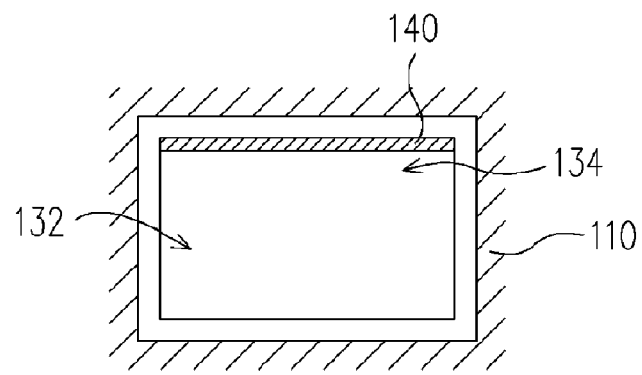
FIG. 1C is a schematic view of a guide light plate positioned via a double sided tape on a frame of the conventional back light module.
Figure 2A:
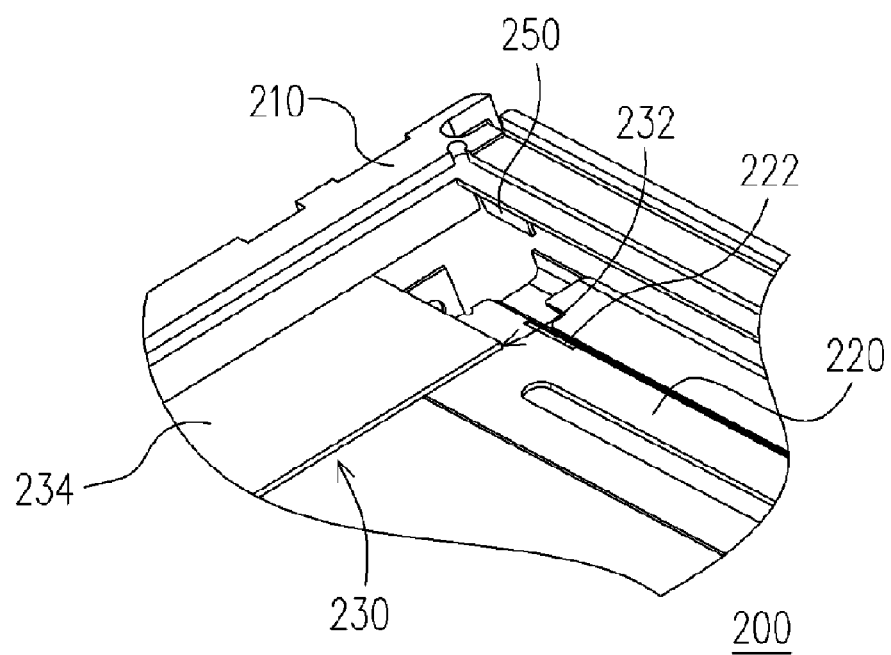
FIG. 2A is an exploded view of a baffle plate connected to a frame of a portion of a back light module according to one embodiment of the present invention.
Figure 2B:
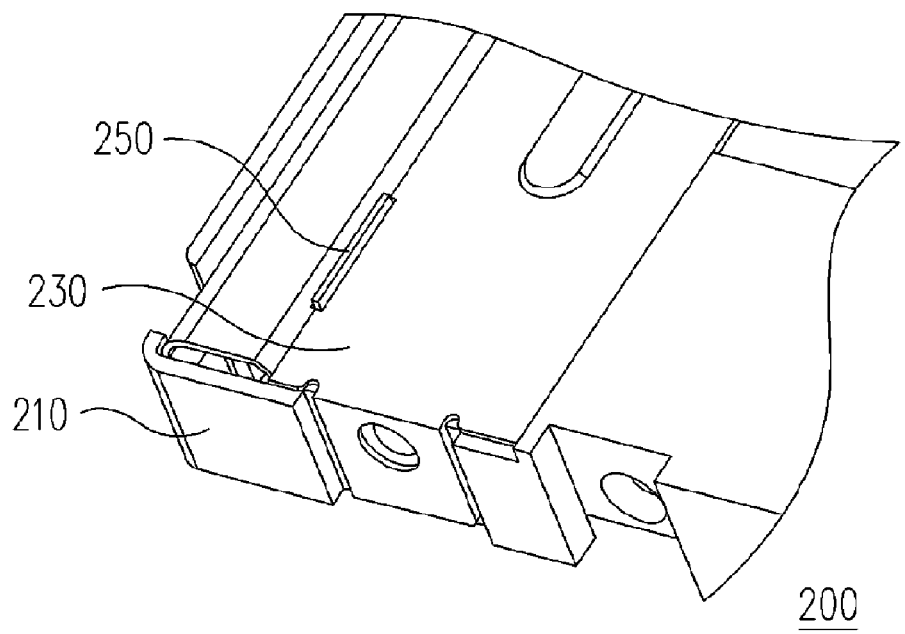
FIG. 2B is a perspective schematic view of a frame with a baffle plate assembled to a reflective mask having an opening of a back light module according to one embodiment of the present invention.
Figure 2C:
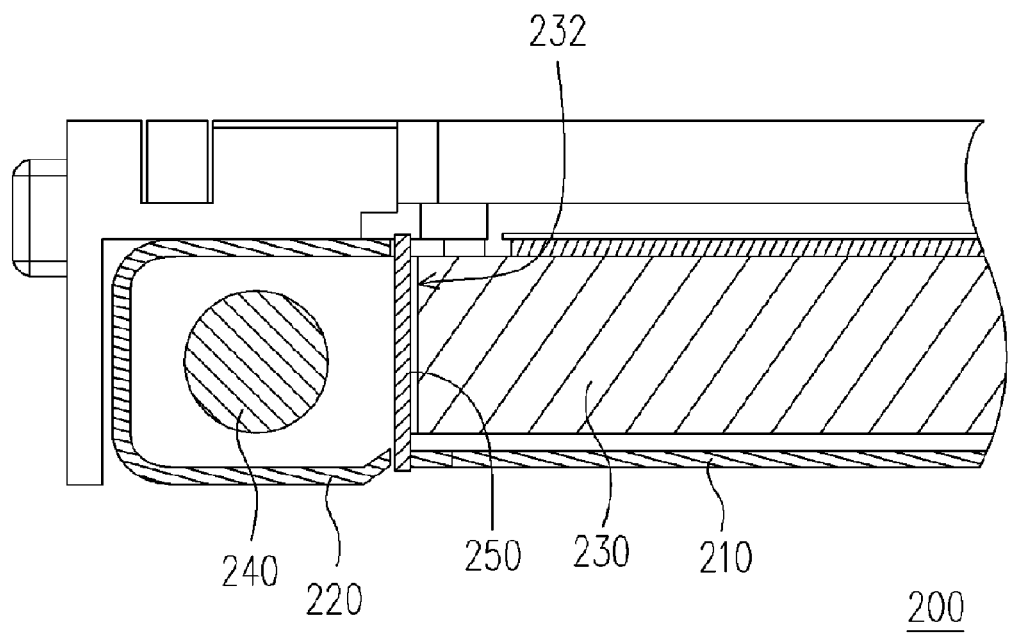
FIG. 2C is a cross-sectional schematic view of a frame with a baffle plate assembled to a reflective mask having an opening of a back light module according to one embodiment of the present invention.

FIG. 2A is an exploded view of a baffle plate connected to a frame of a portion of a back light module according to one embodiment of the present invention. FIG. 2B is a perspective schematic view of a frame with a baffle plate assembled to a reflective mask having an opening of a back light module according to one embodiment of the present invention. FIG. 2C is a cross-sectional schematic view of a frame with a baffle plate assembled to a reflective mask having an opening of a back light module according to one embodiment of the present invention. Referring to FIGS. 2A, 2B, and 2C in sequence, noticeably, the back light module 200 of the present invention can be applied to various electronic products. For example, in one embodiment, the back light module 200 of the present invention is applied to notebook computers.

The back light module 200 comprises a frame 210, a reflective mask 220, a light guide plate 230, a linear light source 240 and a baffle plate 250, wherein the reflective mask 220 is installed in the frame 210. The light guide plate 230 comprises a light incidence side 232, which is locked onto the reflective mask 220. The linear light source 240 is surrounded by the reflective mask 220 and the light incidence side 232 of the light guide plate 230. The light from the linear light source 240 is reflected and concentrated by the reflective mask 220 and enters the light guide plate 230 via the light incidence side 232 thereof serving as a plane light source, and is emitted out through the surface 234 of the light guide plate 230.

In one embodiment, the linear light source 240 can be a cold cathode fluorescent lamp (CCFL), a light emitting diode (LED) array or other appropriate linear light source. In addition, the light guide plate 230 can be a wedge-shaped light guide plate.

Particularly, the baffle plate 250 is disposed between the linear light source 240 and the light guide plate 230 such that the baffle plate 250 does not obstruct light from entering the light guide plate 230. Moreover, for example, the baffle plate 250 is connected to the frame 210 and the reflective mask 220. In one embodiment, one end portion of the baffle plate 250 is attached onto the frame 210 using a double sided tape or other adhesive, and another end portion of the baffle plate 250 is locked to the opening 222 of the reflective mask 220. According to an embodiment of the present invention, the baffle plate 250 is integrally formed with the frame 210 and can be formed using, for example but not limited to, an injection molding method.

During the impact test, an impact force on the light guide plate 230 tends to displace the light guide plate 230 towards the linear light source 240. Because the baffle plate 250 is disposed between the linear light source 240 and the light guide plate 230, the light guide plate 230 is supported by the baffle plate 250, and therefore the impact force on the light guide plate 230 can be effectively absorbed by the baffle plate 250 and reduce the possibility of displacement of the light guide plate 230 towards the linear light source 240 and thereby reduce the possibility of damaging of the linear light source 240 due to the displacement of the light guide plate 230.

Figure 2D:
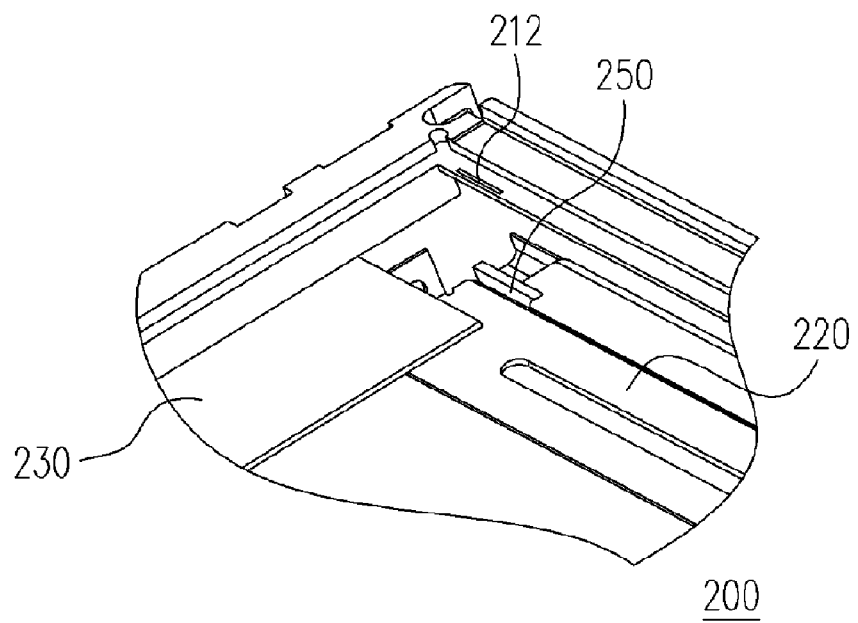
FIG. 2D is an exploded view of a reflective mask with a baffle plate assembled to a frame having an opening of a back light module according to one embodiment of the present invention.

It should be noted that, the connection between the baffle plate 250, the frame 210 and the reflective mask 220 is not limited to those described above. Alternatively, one end of the baffle plate 250 can be attached to the reflective mask 220, and the other end of the baffle plate 250 can be locked to the opening 212 of the frame 210 (as shown in FIG. 2D).

In one embodiment, the material of the baffle plate 250 can be high thermal-conductive material, i.e. metal, to efficiently dissipate the heat. Alternatively, the material of the baffle plate 250 can be elastic material, i.e. plastics, to effectively absorb the impact during the impact test for effectively resist displacement of the light guide plate 230 towards the linear light source 240.

Figure 3A:
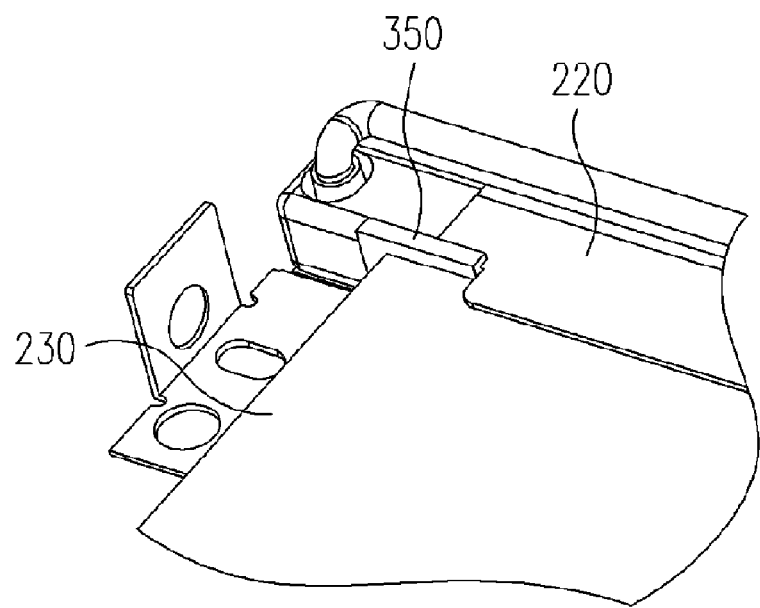
FIG. 3A is a perspective schematic view of a portion of a back light module according to one embodiment of the present invention.
Figure 3B:
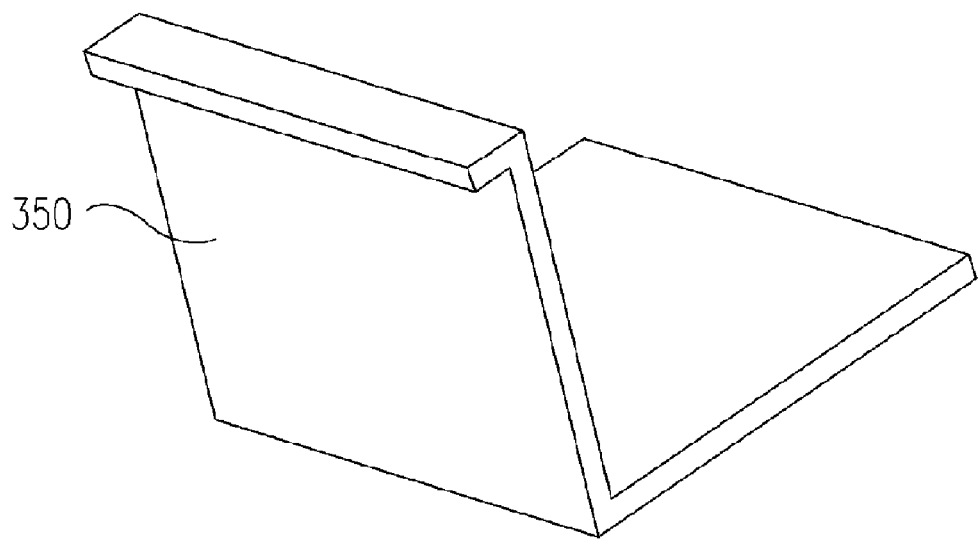
FIG. 3B is a perspective schematic view of a baffle plate according to one embodiment of the present invention.
Figure 3C:
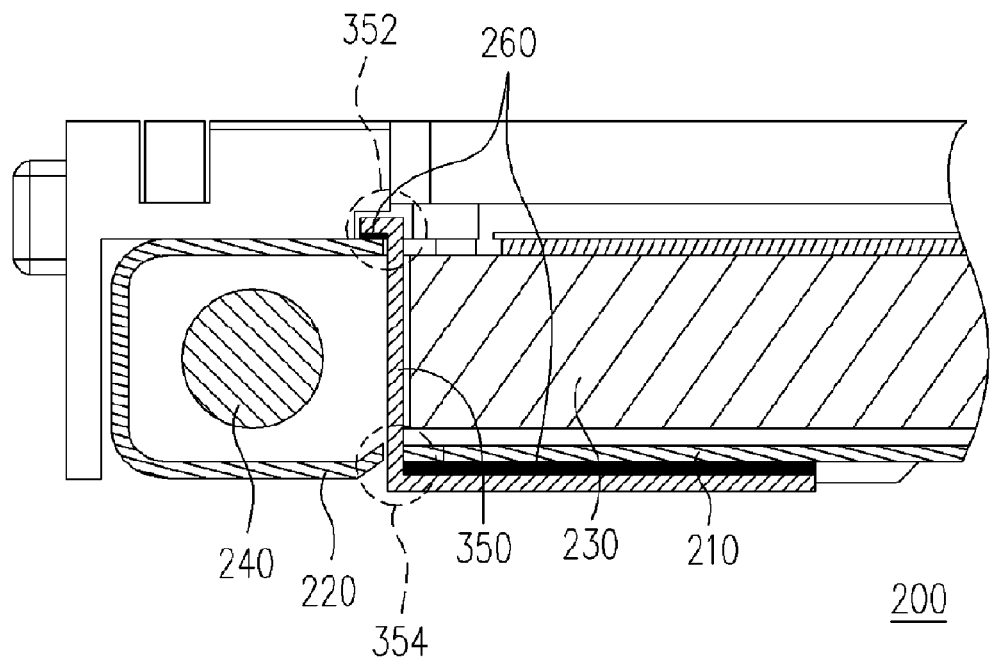
FIG. 3C is a cross-sectional view of a Z-shaped baffle plate connected with a reflective mask and a frame of a portion of a back light module according to one embodiment of the present invention.

FIG. 3A is a perspective schematic view of a portion of a back light module according to one embodiment of the present invention. FIG. 3B is a perspective schematic view of a baffle plate according to one embodiment of the present invention. FIG. 3C is a cross-sectional view of a Z-shaped baffle plate connected with a reflective mask and a frame of a portion of a back light module according to one embodiment of the present invention. Referring to FIGS. 3A, 3B, and 3C, the elements in FIG. 3A to 3C that are same or similar to those shown in FIG. 2A to 2D are numbered with same reference numbers, and detailed description thereof will not be repeated hereinafter. Hereinafter, the baffle plate 350 will be described in detail.

Referring to FIG. 3C, according to one embodiment of the present invention, in order to further enhance the impact endurance of the baffle plate 350, the baffle plate 350 can be configured into a Z-shape structure comprising two deflection portions 352 and 354 (as shown in FIG. 3B), wherein the deflection portion 352 of the baffle plate 350 is propped against the reflective mask 220 to resisting the displacement of the reflective mask 220 during the impact test. The deflection portion 354 of the baffle plate 350 is propped against the frame 210. In addition, in order to further steadily fix the baffle plate 350 onto the flame 210 and/or the reflective mask 220, a double sided tape 260 or other adhesive can be used (as shown in FIG. 3C). Thus, the baffle plate 350 can be disposed between the frame 210 and the reflective mask 220 for resisting the displacement of the reflective mask 220 and the light guide plate 230.

Accordingly, the baffle plate 350 is adapted for absorbing impact force on the light guide plate 230 during the impact test and thereby resist the displacement of the light guide plate 230, and therefore the possibility of damage to the linear light source 240 due to the displacement of the light guide plate 230 can be effectively reduced. Furthermore, because the deflection potion 352 of the baffle plate 350 is propped against the reflective mask 220, therefore the displacement of the reflective mask 220 can be effectively reduced.

Figure 3D:
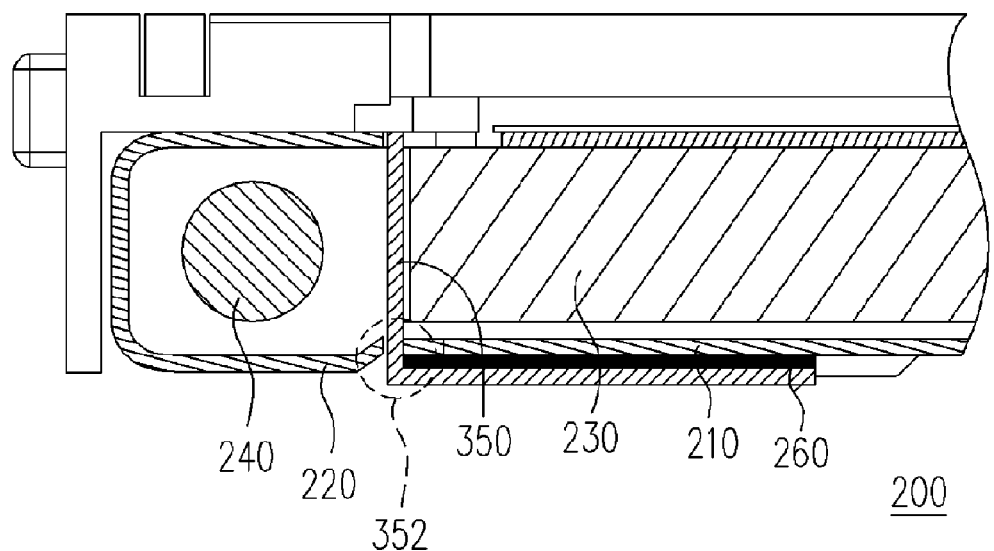
FIGS. 3D and 3E are two cross-sectional views of a L-shaped baffle plate connected with a frame and a reflective mask of a portion of a back light module respectively according to one embodiment of the present invention.
Figure 3E:
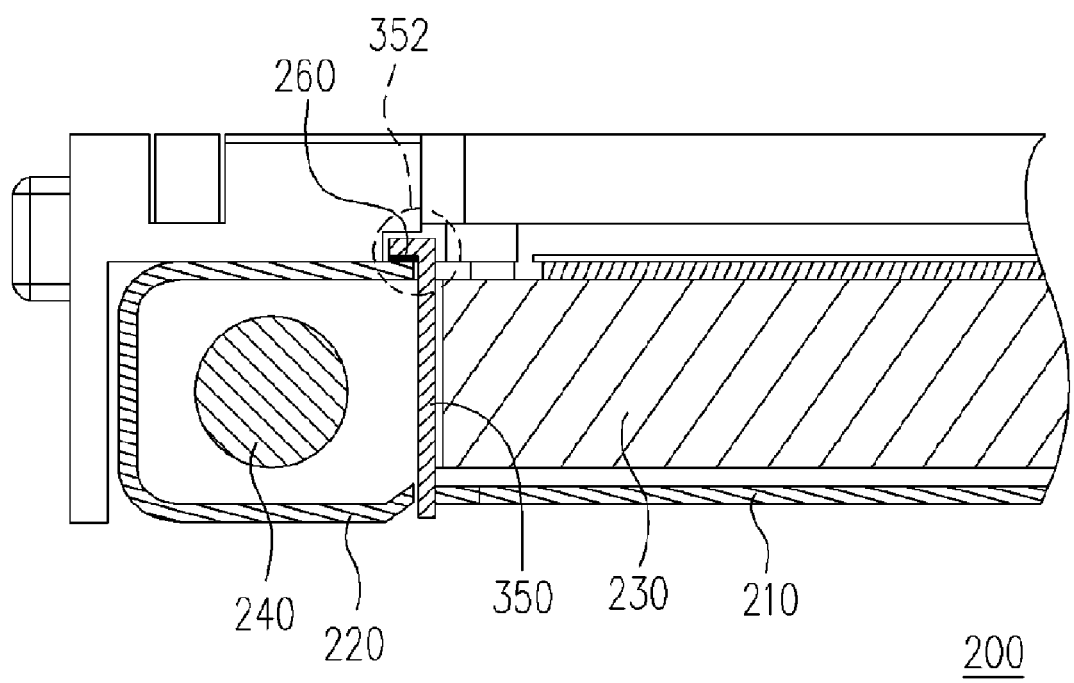

Alternatively, the shape of the baffle plate 350 can be L-shape shown in FIG. 3D or FIG. 3E. Referring to FIG. 3D, the baffle plate 350 comprises a deflection potion 352, which can be adopted to prop against the frame 210. In addition, the baffle plate 350 can be fixed to the frame 210 by using the double-sided tape 260. Alternatively, as shown in FIG. 3E, the deflection potion 352 of the L-shaped baffle plate 350 can be propped against the reflective mask 220. It should be noted that the baffle plate 350 can also be fixed to the reflective mask 220 by using the double-sided tape 260.

In one embodiment, the material of the baffle plate 350 can be high thermal-conductive material, i.e. metal, for effectively dissipating heat. Alternatively, the material of the baffle plate 350 can be elastic material such as plastic for effectively absorbing the impact force on the light guide plate 230 during the impact test.

It should be noted that regardless of the shape/design of the above-mentioned baffle plate, the baffle plate is provided for effectively absorbing the impact force during the impact test for effectively reducing the possibility of displacement of the light guide plate and the reflective mask, and thereby reduce the possibility of damage to the linear light source due to the displacement of the light guide plate and/or the reflective mask.

In summary, because the designed baffle plate is disposed between the linear light source and the light guide plate, therefore, the light guide plate can effectively absorb the impact force during the impact test and thereby effectively reduce the possibility of displacement of the light guide plate and/or the reflective mask for effectively reduce damage of the linear light source due to displacement of the light guide plate and/or the reflective mask. Thus, the reliability of the notebook computer can be effectively promoted.

The above description provides a full and complete description of the embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A back light module, comprising:
a frame;
a reflective mask, installed in the frame;
a light guide plate, comprising a light incidence side locked onto the reflective mask;
a linear light source, surrounded by the light guide plate and the reflective mask; and
a baffle plate, disposed between the linear light source and the light guide plate, wherein the baffle plate is connected to the reflective mask and the frame, wherein the reflective mask comprises an opening and the baffle plate is locked to the opening of the reflective mask.

2. The back light module of claim 1, wherein the baffle plate is configured into a Z-shape and comprises a first deflection portion and a second deflection portion, and wherein the first deflection portion of the baffle plate is propped against the reflective mask and the second deflection portion of the baffle plate is propped against the frame.

3. The back light module of claim 2, wherein the baffle plate is fixed on the frame and/or the reflective mask by using a double sided tape.

4. The back light module of claim 1, wherein the baffle plate is configured into a L-shape and comprises a deflection portion which is adapted for supporting against the frame.

5. The back light module of claim 4, wherein the baffle plate is fixed on the frame by using a double sided tape.

6. The back light module of claim 1, wherein the baffle plate is configured into a L-shape and comprises a first deflection portion which is adapted for supporting against the reflective mask.

7. The back light module of claim 6, wherein the baffle plate is fixed on the reflective mask by using a double sided tape.

8. The back light module of claim 1, wherein a material of the baffle plate comprises a high thermal-conductive material.

9. The back light module of claim 8, wherein the high thermal-conductive material comprises metal.

10. The back light module of claim 1, wherein a material of the baffle plate comprises an elastic material.

11. The back light module of claim 10, wherein the elastic material comprises plastic.

12. The back light module of claim 1, wherein the frame comprises an opening and the baffle plate is locked to the opening of the frame.

13. A back light module, comprising:
a frame, comprising a baffle plate;
a reflective mask, installed in the frame;
a light guide plate, comprising a light incidence side locked onto the reflective mask; and
a linear light source, surrounded by the light guide plate and the reflective mask, wherein the baffle plate is positioned between the linear light source and the light guide plate, and the baffle plate is connected to the reflective mask, wherein the reflective mask comprises an opening and the baffle plate is locked to the opening of the reflective mask.

14. The back light module of claim 13, wherein a material of the baffle plate comprises an elastic material.

15. The back light module of claim 14, wherein the elastic material comprises plastic.

* * * * *